Jan. 10, 1967 N. STEVENS 3,297,313
UNIVERSAL CLAMP FIXTURE
Filed Jan. 12, 1965 7 Sheets-Sheet 1

Inventor:
Nichols Stevens.
By Hee & Hee Attys.

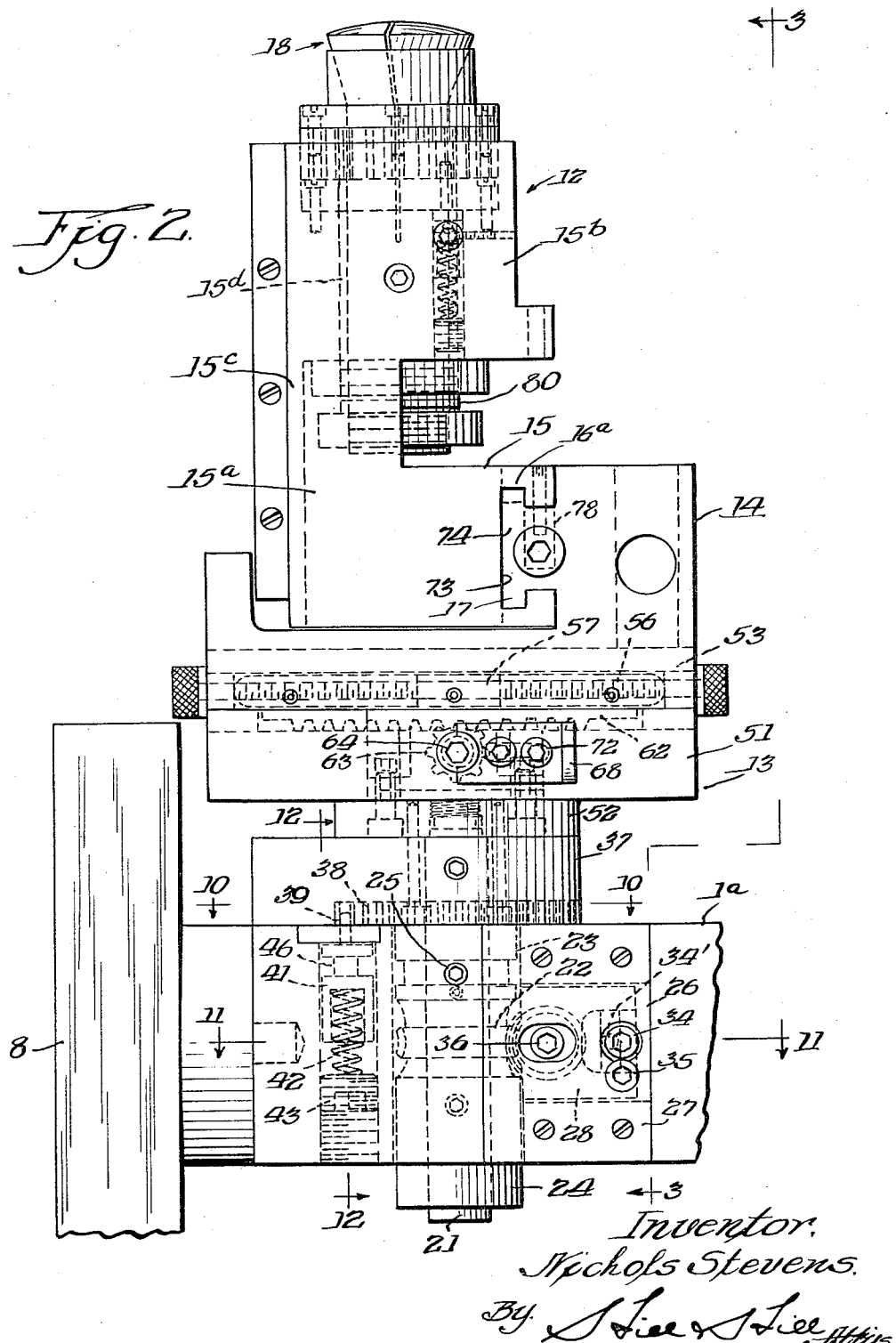

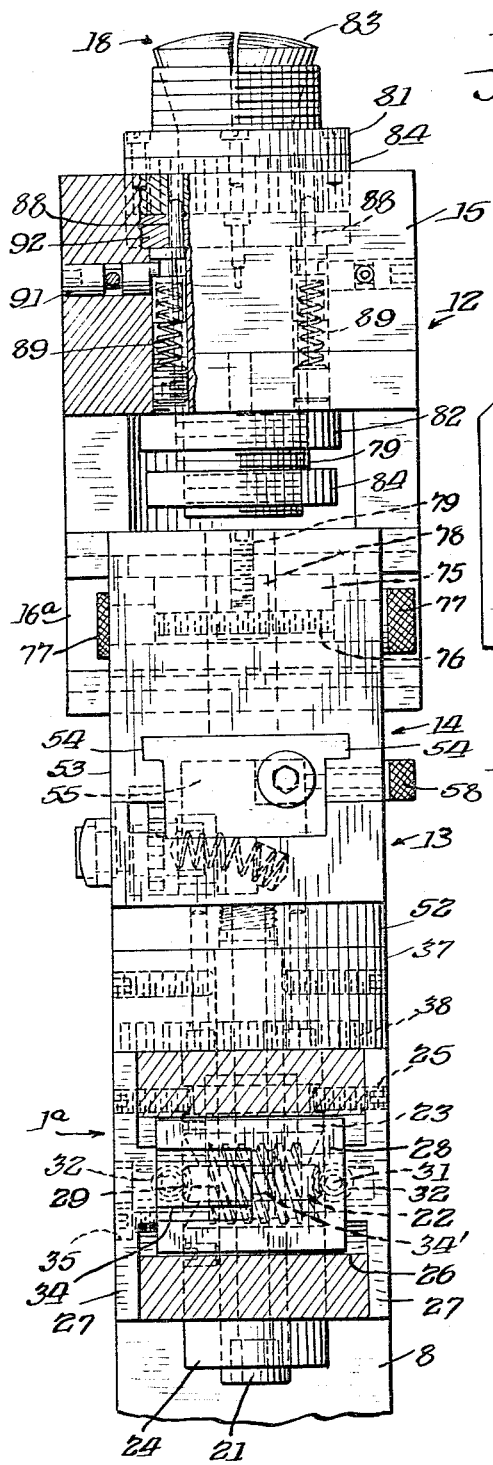
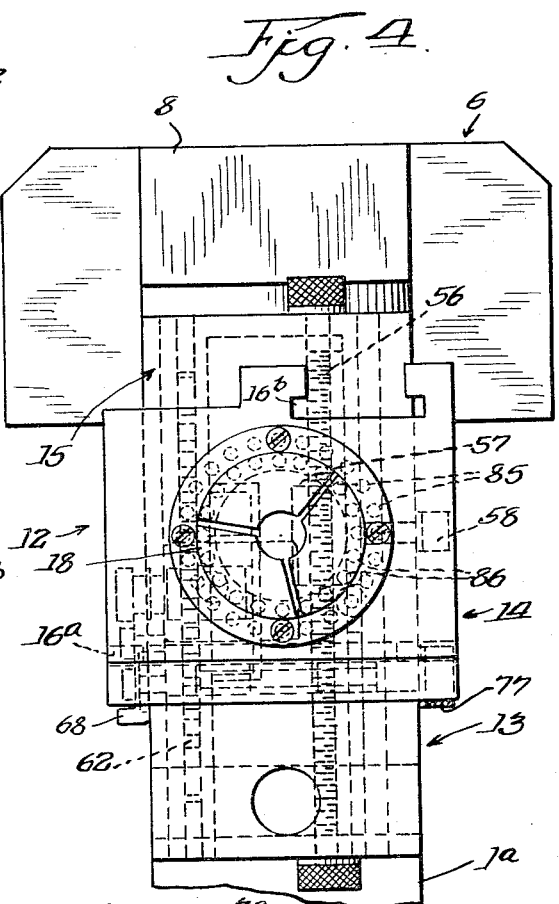
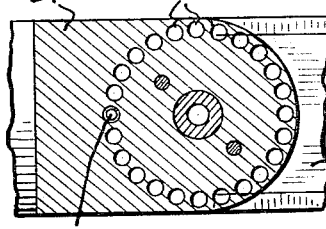

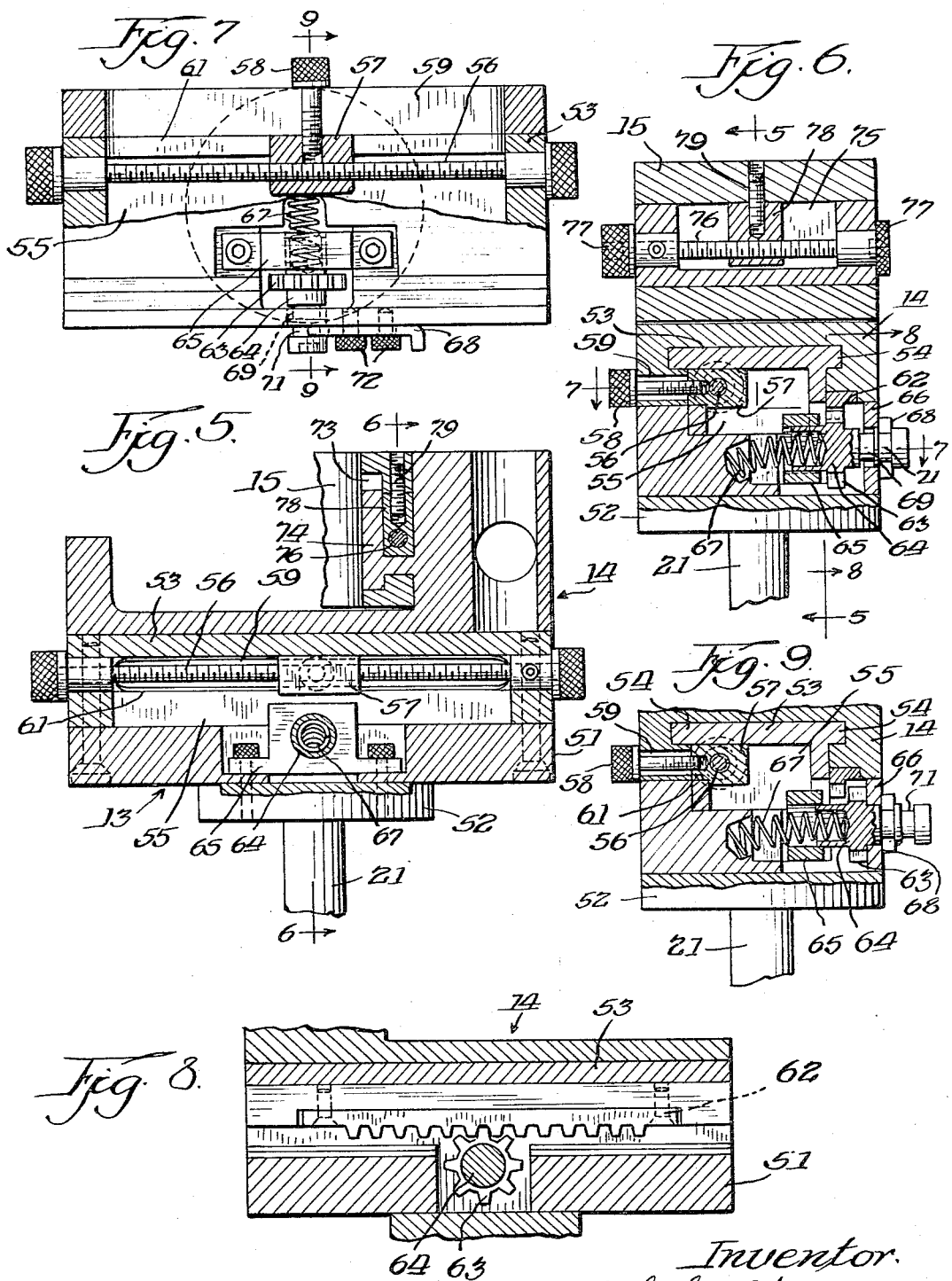

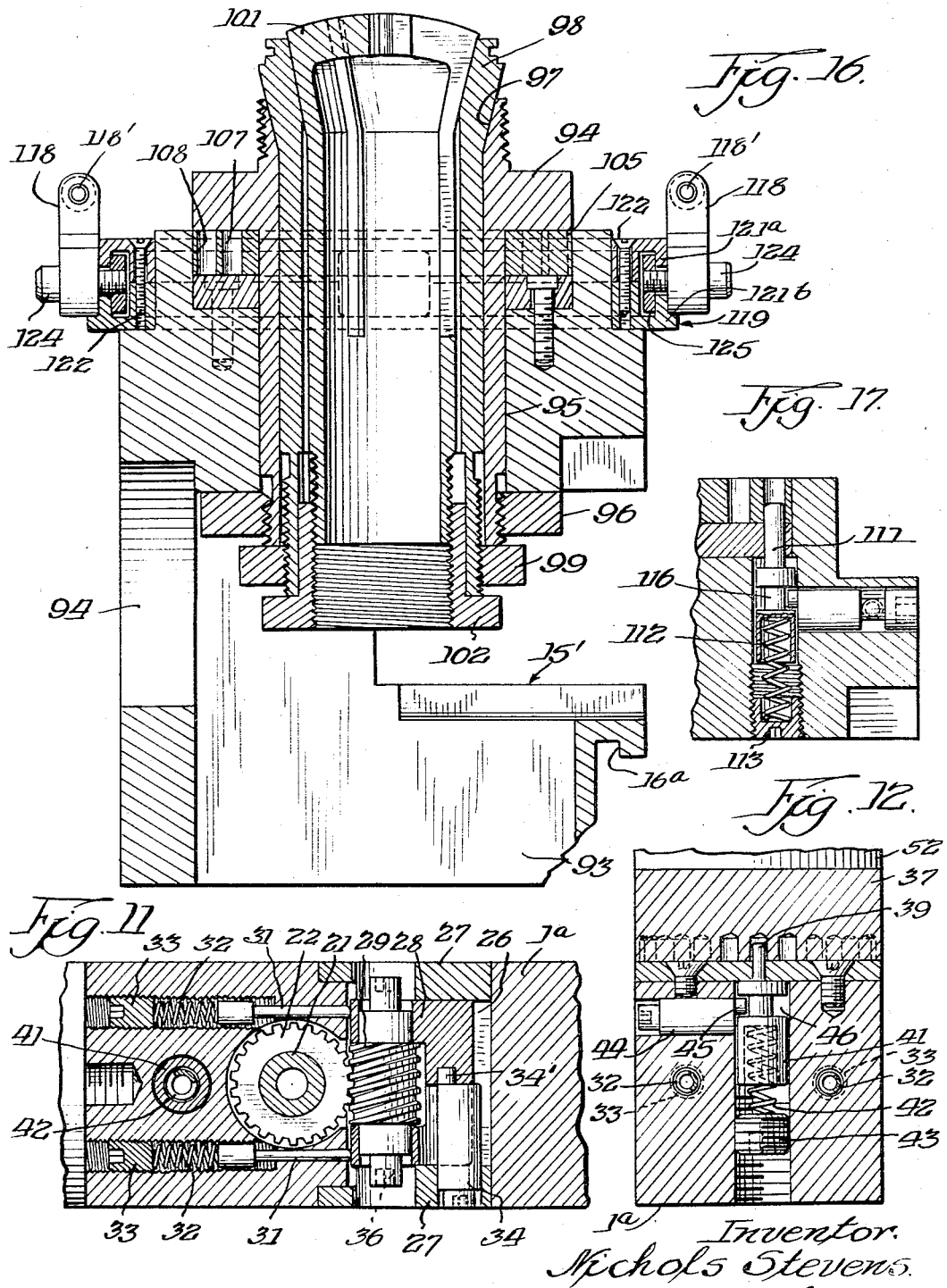

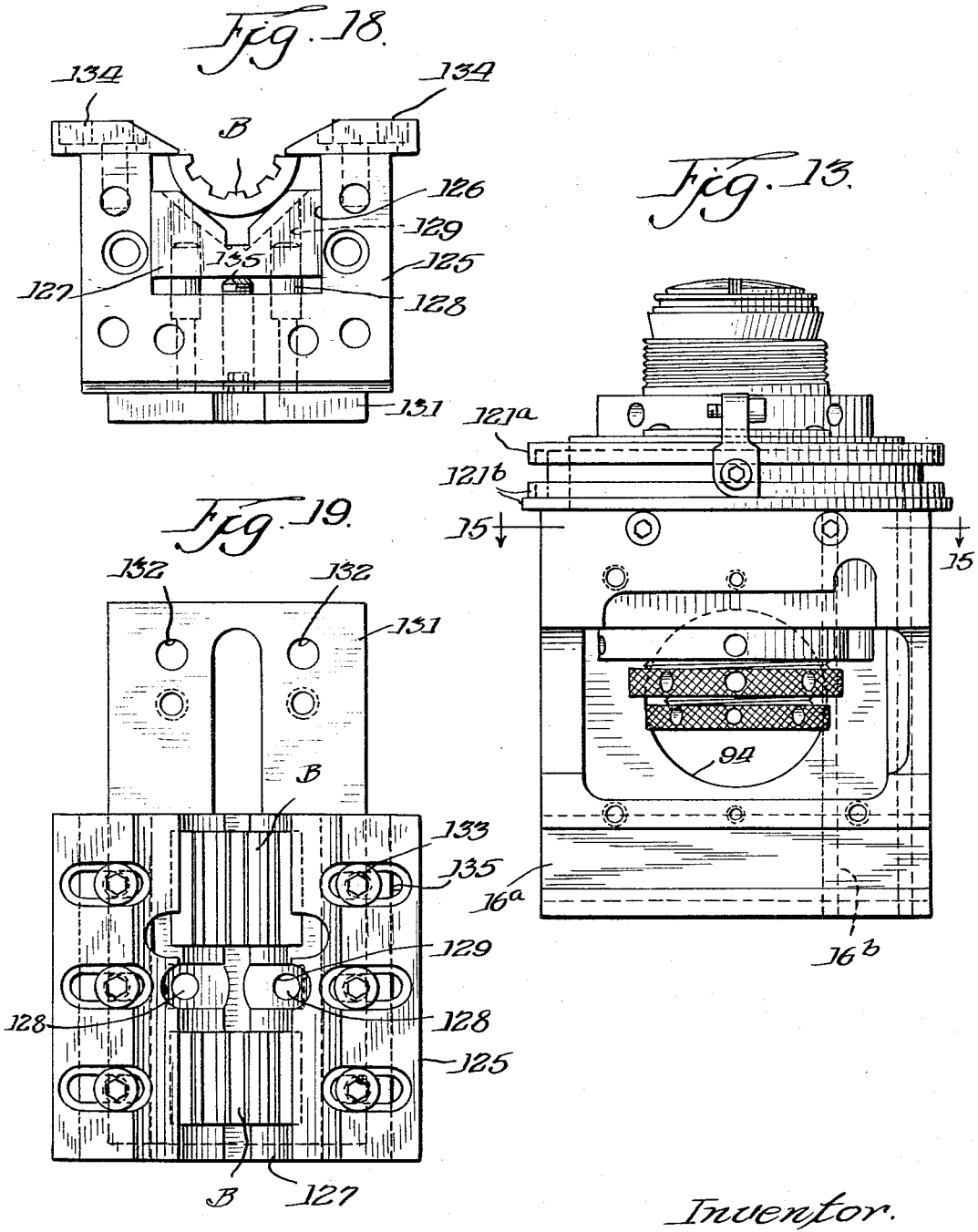

Jan. 10, 1967  N. STEVENS  3,297,313
UNIVERSAL CLAMP FIXTURE
Filed Jan. 12, 1965  7 Sheets-Sheet 7

Inventor:
Nichols Stevens.
By Liee & Liee Attys.

United States Patent Office 3,297,313
Patented Jan. 10, 1967

3,297,313
UNIVERSAL CLAMP FIXTURE
Nichols Stevens, 2414 N. Spaulding Ave.,
Chicago, Ill. 60647
Filed Jan. 12, 1965, Ser. No. 424,986
18 Claims. (Cl. 269—71)

The invention is directed generally to supporting structures for tools or objects being worked upon, and more particularly to a universal type tool and work supporting fixture for use in connection with machine tool operations and the like.

The invention is an improvement on the device illustrated in my prior Patent No. 2,970,833, granted on February 7, 1961, the present invention utilizing a similar clamping structure, and in particular the use of two supporting blocks or bars which are adjustable relative to each other generally corresponding to the construction illustrated in my prior patent, but provided with additional fixtures and carriage structures. The adjustment of the two blocks or bars may be accomplished with screw structures constructed similar to that disclosed in said patent.

The present invention has among its objects the reproduction of a universal machine tool and work holding fixture which, as its name implies, is substantially universal as to the adjusting movements which may be utilized whereby an almost infinite combination of radical and straight lined movements, at designated angles with respect to a reference line or axis, may be achieved.

Another object of the invention is the production of a fixture having the above advantages which may be utilized to perform the various clamping and chucking operations, including the provision of a collet chuck which may be utilized in connection with indexing and similar operations.

A further operation of the invention is the production of such a device in which objects may be supported for machine operations thereon which normally could not be readily accomplished on standard type of machines or fixtures, for example the supporting of split bushings and the like.

A further object of the invention is the production of such a device having novel adjusting means for effecting adjustment both in radical and straight line operations, having a high degree of accuracy, and which is very flexible in operation providing fine micrometer type adjustments on the various relatively movable structures.

Many other objects and advantages of the invention herein shown and described will be obvious to those skilled in the art from the disclosure herein given.

In the drawings, wherein like reference characters indicate like or corresponding parts:

FIG. 2 is a side elevational view of a portion of the structure of FIG. 1;

FIG. 3 is a sectional view taken approximately on the line 3—3 of FIG. 2;

FIG. 4 is a top view of the structure illustrated in FIG. 2;

FIG. 5 is a sectional view taken approximately on the line 5—5 of FIG. 6 illustrating details of the carriage structure disclosed in FIGS. 2 to 4;

FIG. 6 is a sectional view taken approximately on the line 6—6 of FIG. 5;

FIG. 7 is a sectional view taken approximately on the line 7—7 of FIG. 6;

FIG. 8 is a sectional view taken approximately on the line 8—8 of FIG. 6;

FIG. 9 is a sectional view taken approximately on the line 9—9 of FIG. 7;

FIG. 10 is a sectional view taken approximately on the line 10—10 of FIG. 2;

FIG. 11 is a sectional view taken approximately on the line 11—11 of FIG. 2;

FIG. 12 is a sectional view taken approximately on the line 12—12 of FIG. 2;

FIG. 13 is a side elevational view of a collet chuck similar to that illustrated in FIGS. 1–4 and of similar construction, but illustrating details of an additional adjusting structure;

FIG. 16 is a sectional view taken approximately on the line 16—16 of FIG. 14;

FIG. 17 is a sectional view taken approximately on the line 17—17 of FIG. 14;

FIG. 18 is an end elevational view of an additional attachment for use with the fixture, for holding small pieces such as split bushings and the like; and FIG. 19 is a top plan view of the structure illustrated in FIG. 18.

The present invention contemplates the utilization of a pair of elongated generally rectangular shaped blocks which may be adjustably connected together by a plurality of screws, the construction generally being similar to that illustrated in my prior patent whereby the blocks may be utilized to provide clamping forces on an object to be supported, or may be adjusted to dispose the respective blocks in various angular relationships relative to each other, one block being constructed for rigid adjustable support from machine bed or other supporting structure, while the other block may be utilized to support a desired fixture such as a collet chuck, work holding fixture or carriage, and the like. If desired, the second block may be eliminated and the work or tool supporting structure mounted directly on the rigidly supported block. The latter preferably is rigidly supported for rotational adjustment about its longitudinal axis, and if desired, may also be supported for pivotal movement about a transversely extending axis. In like manner the tool or work holding structure may be supported on either of the blocks for straight line feeding operations, radial indexing operations, and the like, at the same time permitting angular adjustments with respect to the axes of the two blocks to provide a work axis or line of feed in substantially any desired relative directions and relationships.

The tool and work supporting structure, in a particular embodiment illustrated, comprises a base member which is pivotally mounted on one of the elongated blocks on an axis extending at right angles to the longitudinal axis of the block and having an intermediate carriage slidably mounted thereon for movement in a direction at right angles to the pivotal axis of the base member and thus in a plane extending parallel to the longitudinal axis of the supporting block. Slidably mounted on the intermediate carriage is a tool and work holding carriage which is movable relative thereto in a direction extending at right angles to the direction of travel of the intermediate carriage relative to the base member, the tool and work supporting carriage preferably being formed with a pair of mounting means, cooperable with similar mounting means on the intermediate carriage, whereby the tool and work supporting carriage may be attached to the intermediate carriage in either one of two positions which are at right angles with respect to each other. Thus in the event the tool and work supporting carriage is provided with a chuck or other tool or work supporting member, such as a collet chuck, the axis of the latter may be disposed with respect to the intermediate carriage in either of two positions which are at right angles to one another.

Figure 1:
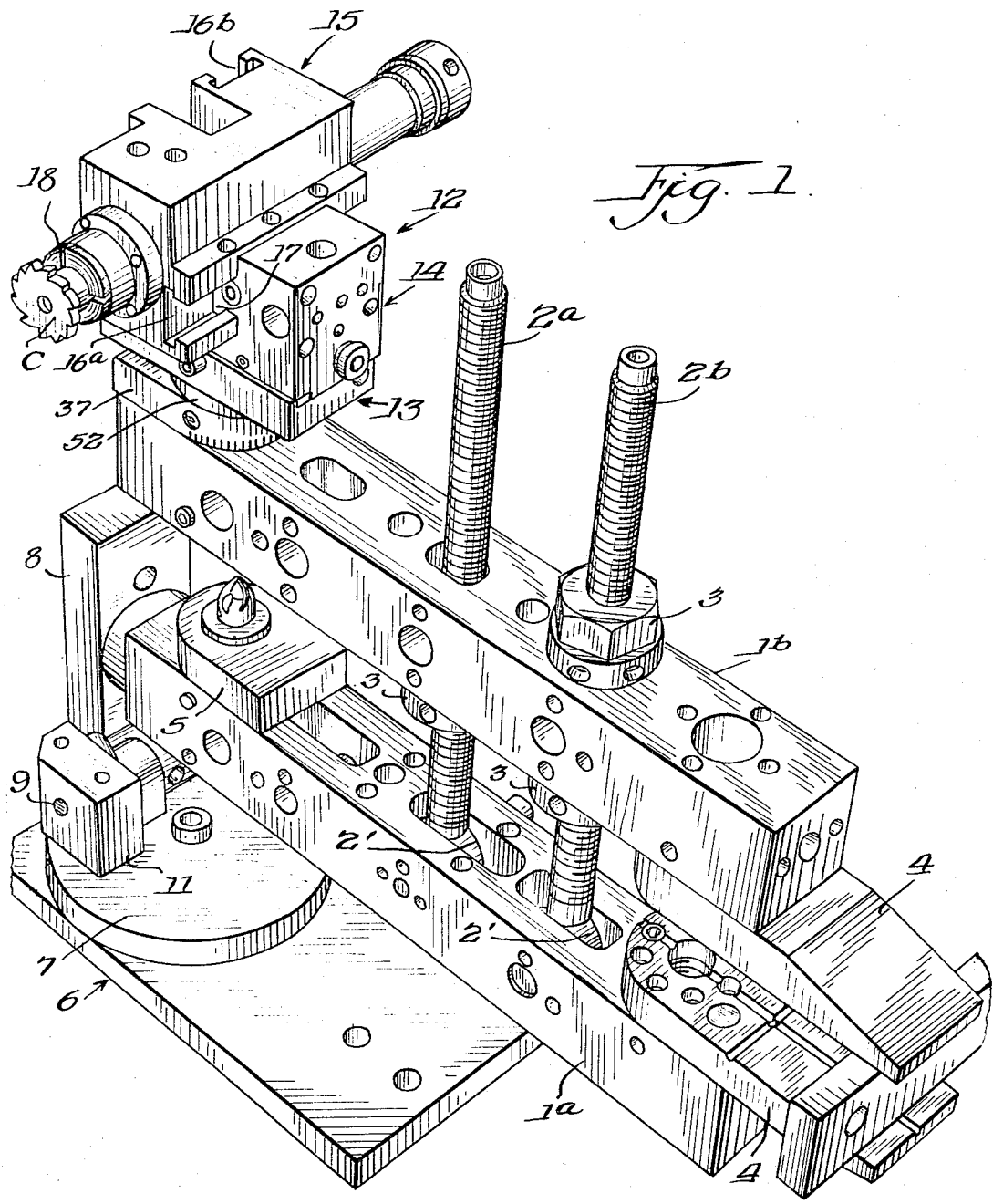
FIG. 1 is a perspective view of a fixture embodying the present invention.
Figure 14:
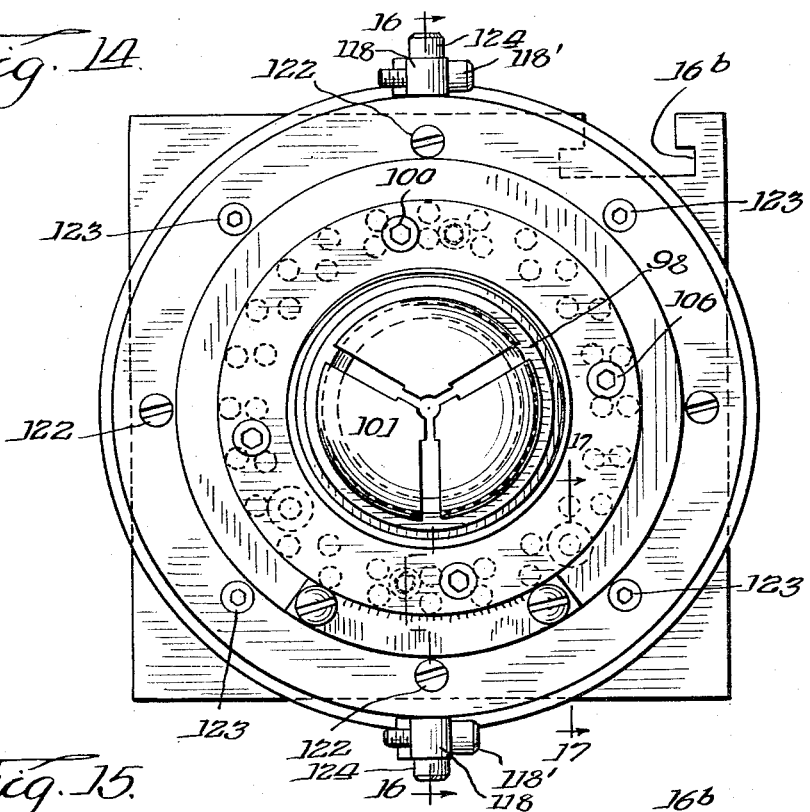
FIG. 14 is a top plan view of the structure illustrated in FIG. 13.

Referring to the drawings, and more particularly to FIGS. 1 to 4, the reference numeral 1a and 1b designate a respective pair of elongated blocks, of rectangular cross section which are operatively connected together by means of a plurality of screws 2a and 2b whereby the respective blocks may be disposed in substantially parallel relation, as illustrated in FIG. 1, or may be disposed with their axes extending at an angle to one another, the adjustment of the blocks being achieved by a plurality of nuts 3 engageable with the block 1b. The opposite ends of the screws 2a and 2b are provided with enlarged heads 2' which are operatively connected to the block 1a for pivotal movement about parallel axes which extend at right angles to the plane of the axes of the screws 2a and 2b. Thus by suitable adjustment of the nuts 3, the longitudinal axis of the block 1b may be disposed parallel or at an angle with respect to the axis of the block 1a.

As illustrated in FIG. 1, the ends of the blocks may be provided with suitable clamping jaws 4, on a tool supporting block 5, and the like. The construction thus far described corresponds generally to that illustrated in my issued patent heretofore referred to.

In the embodiment of the invention illustrated, the block 1a is mounted on a supporting structure indicated generally by the numerals 6, illustrated as having a base portion 7 and an upright portion 8, pivotally mounted on the base portion 7 for movement on a horizontal axis, the block 8 being supported by pins 9 seated in standards 11, only one of which is illustrated in FIG. 1. The block 1a is supported from the block 8 by suitable means whereby the block 1a may be pivotally rotated about its longitudinal axis and locked in any desired position of adjustment, such connecting means, for example, being constructed similar to means which will hereinafter be described in connection with other portions of the device.

In the embodiment of the invention illustrated in FIG. 1, supported on the upper block 1b is a tool and work supporting structure, indicated generally by the numeral 12, illustrated as comprising a base member 13 which is pivotally mounted on the block 1b for rotation about an axis extending at right angles to the longitudinal axis of the block, an intermediate carriage 14 slidably mounted on the base member 13 for movement in a direction extending at right angles to the pivotal axis of the base member 13, and a tool and work supporting carriage 15 which is slidably supported on the intermediate carriage 14 for movement in a direction transverse to the direction of travel of the intermediate carriage 14 relative to the base member 13.

As illustrated in FIG. 1, the supporting carriage 15 is formed with a pair of slots 16a and 16b, disposed at right angles to one another, each adapted to receive the complementally shaped guide head 17 on the intermediate carriage 14. In the embodiment illustrated in FIGS. 1-4, the supporting carriage 15 is constructed as a collet holder or chuck adapted to receive and support a collet 18 which in turn may support the tool or work, FIG. 1 illustrating the supporting of a cutter or other element c for receiving finishing operations to be applied thereto. It will be noted that by the provision of a pair of guide slots 16a and 16b, the supporting carriage 15 may be attached to the intermediate carriage 14 to dispose the axis of the collet 18 either transversely with respect to the pivotal axis of the base member 13 relative to the block 1b, as illustrated in FIG. 1, or in the event that the head 17 is disposed in the slot 16b, with the collet axis extending parallel to the pivotal axis of the base member 13.

It will be appreciated that by means of the adjusting screws 2a and 2b and adjustment of the axes of the blocks 1a and 1b with respect to one another, as well as adjustment of the block 1a about its longitudinal axis with respect to the block 8, and pivotal movement of the base member 13 relative to the block 1b, the collet of the collet 18 may be disposed at substantially any desired relation with respect to a cutting member of a machine tool, or other desired object. Likewise, the relative movement of the intermediate carriage with respect to the base member 13, and transverse movement of the supporting carriage 15 relative to the intermediate carriage 14 provides adequate adjustment or feeding action of the objects supported in the collet 18 with respect to such a tool or the like. Obviously by varying the axial relationship of the block 1a with respect to the horizontal or rotating of such block about its longitudinal axis, vertical travel of the supporting carriage 15 relative to the base structure 6 may be achieved.

It will be apparent that if desired the block 1b may be omitted and the base member 13 attached directly to the block 1a, for example taking the place of the block 5. This arrangement is illustrated in FIGS. 2 and 3 of the drawings.

The details of the pivotal connection between the base member 13 and associated block 1a or 1b are illustrated in FIGS. 2, 3 and 10 to 12.

Secured to the base member is a hollow spindle 21 which is threaded into the base member 13, and suitably attached to the spindle is a worm wheel 22 and collars 23 and 24, the collar 23 having a peripheral slot therein for the reception of set screw 25 which prevents axial movement of the spindle relative to the block 1a as illustrated in FIGS. 2 and 3.

The block 1a is formed with a recess 26 extending transversely therethrough, closed at its respective ends by side plates 27 suitably secured by screws or other means to the block and disposed in such recess for sliding movement therein is a worm supporting block 28 in which is rotatably mounted a worm gear 29. When the block is in the position illustrated in FIG. 11, the worm gear will be operatively engaged with the worm wheel 22 and by moving the block 28 as viewed in FIG. 11, the worm may be disengaged from the worm wheel, whereby the spindle 21 is not restricted thereby. The block 28 is normally urged to the right as viewed in FIG. 11 by a pair of elongated pins 31 which are biased by compression springs 32 disposed in threaded bores in the block 1a and retained therein by threaded plugs 33. Movement of the block 28 from worm engaging to worm disengaging positions is controlled by a rotatable member 34 which is provided at its inner end with an eccentric portion 35 engageable in a cooperable vertical slot disposed in the adjacent face of the block 28, whereby rotation of the member 34' will effect a camming of the block 28 in the desired direction. The member 34 is retained in operative position within the block 1a by suitable means such as the screw 35 threaded into the adjacent plate 27 and adapted to overlie a portion of the member 34, thereby preventing its withdrawal from the block 1a. The ends of the shaft supporting the worm wheel 29 may be provided with suitable means such as a hex socket 36 adapted to receive an Allen wrench or the like, by means of which the worm 28 may be rotated, and thus the spindle 21 and structure supported thereon rotated about the axis of the spindle.

If desired, indexing means may also be provided, which construction is illustrated in FIGS. 2, 3, 10, 11 and 12. The lower end portion of the base member 13 may be provided with an indexing block 37 having a plurality of indexing holes 38 therein, as illustrated in FIG. 10, and adapted to receive an indexing pin 39 carried by a cylindrical member 41 which is urged upwardly by a compression spring 42, the lower end of the spring as illustrated in FIG. 2 being retained in position by a threaded plug 43. As illustrated in FIG. 12, the indexing pin 39 may be moved axially by means of a cylindrical member 44 which is rotatably mounted in a bore extending at right angles to the axis of the member 41 and provided with an eccentric portion 45 engageable in a cooperable annular slot 46 formed in the member 41, with the member 44 being retained within the block 1a by a screw threaded into the block and overlying an adjacent shoulder of the member 44, the screw corresponding generally to the screw 35 which retains the member 34 within the block. The outer end of the member 44 may be provided with a hex socket in the end face thereof to receive an Allen wrench or the like by means of which the member may be rotated, thereby either extending or withdrawing the index pin 39 with respect to the indexing bores 38.

In the particular embodiment of the invention illustrated, the base member 13 is fabricated from a plurality of pieces, the indexing block 37 comprising one such piece and being connected with the main member 51 thereof a cylindrical disk 52, the indexing block 37 being secured to the disk by screws and the disk in turn being secured to the member 51 by additional screws, to form a very rigid assembly.

Rigidly mounting on the block 51 by means of screws or the like and forming a part of such block is a member 53 having outwardly disposed flanges 54 formed thereon which provide rails on which the intermediate carriage 14 is movable. As illustrated in FIGS. 5, 6 and 7 the member 53 cooperates with the block 51 to define a chamber 55 in which is disposed a screw 56 having its ends journaled in the end walls of the member 55 as clearly illustrated in FIGS. 5 and 7. Movable within the chamber 55 is a guide member 57 which is provided with a threaded bore therein through which the screw 56 operatively extends, rotation of the screw being operative to move the member 57 therealong.

The guide member 57 is adapted to be releasably connected with the intermediate carriage 14 by a clamp screw 58 which extends through an elongated slot 59 in the intermediate carriage 14 and is threaded into the guide member 57, as clearly illustrated in FIGS. 6, 7 and 9, the guide member extending through a slot 61 in the member 54 and bearing on the adjacent face of the intermediate carriage 14 adjacent the slot 59, thereby clamping the intermediate portion of the carriage 14 between the guide member and the head of the screw 58. When the guide member is so clamped to the carriage 14, the two move as a unit and the carriage 14 may thus be moved relative to the base member 51 by rotating the screw 56 in the desired direction by means of the knurled heads at each end thereof. Likewise, when it is desired to operate the carriage 14 independently of the action of the screw 56, the screw 58 may be released, thereby disconnecting the block 57 and carriage 14 permitting free movement between the latter and the block 51.

Means is also provided for effecting relative movements between the carriage 14 and the block 51, such means comprising a rack and pinion arrangement in the form of a rack member 62 (as illustrated in FIG. 8) which is suitably secured to the carriage 14 by screws or the like and which is cooperable with a pinion 63 which is provided on a rotatable shaft 64 supported at one end in a block 65 secured by means of screws or the like to the block 51 (as illustrated in FIGS. 5 and 7), the opposite end of the shaft 64 being supported in the portion 66 of the block 51. As will be apparent from a reference to FIGS. 6, 7 and 9, the shaft 64 and pinion 63 are axially movable from a position in which the pinion is meshed with the rack 62, as illustrated in FIG. 6, to a position in which the pinion is disengaged from the rack, as illustrated in FIG. 9. The shaft 64 is urged axially outwardly by a compression spring 67, one end of which is seated in a bore in the adjacent end of the shaft 64 and the opposite end in a recess formed in the block 51. The pinion 63 is adapted to be retained in either of its adjusted positions by a slidable latch bar 68 mounted at the exterior of the block 51, having a semi-circular end portion engageable with either of two slots 69 or 71 in the outer end of the shaft 64, the latch member 68 being guided and adapted to be locked in position by screws 72 which are threaded into the block 51, the screws passing through a cooperable elongated slot in the latch member of a length to permit the latter to move from engaged position with the shaft 64, as illustrated in FIG. 7, to a disengaged position, whereby the shaft is free to be moved axially. The outer end of the shaft 64 is provided with suitable means, as for example, a hex socket for facilitating rotation of the shaft and pinion.

As illustrated in FIGS. 2 and 5, the work or tool supporting carriage 15 is provided with a generally T-shaped slot 73 which is slidably mounted on a complementally shaped guide head 74 formed on the intermediate carriage 14, the head 74 having an elongated recess 75 therein across which a threaded screw 76 extends, the ends of which are provided with knurled heads 77. Cooperable with the screw 76 is a guide member 78 which is rigidly attached to the carriage 15 by suitable means such as a screw 79. Thus by rotating the screw 76, the carriage 15 may be moved along by the guide head 78 in a direction at right angles to the direction of travel of the intermediate carriage 14 relative to the base member 13.

Two embodiments of the work and tool supporting carriage 15 are illustrated, one form being illustrated in FIGS. 1 to 4, and adapted for relatively small work or tool holders, while the other, illustrated in FIGS. 13 to 17, is designated for holders of greater proportions and thus provides additional features not found on the holder 15.

Referring to FIGS. 1 through 4, the holder 15 is generally C-shaped having a mounting leg 15a and a tool or work supporting leg 15b connected by an intermediate portion 15c. The leg 15c is provided with a bore 15d in which is disposed a threaded sleeve 80 which carries a collet receiving socket head 81 at its upper end, the sleeve 80 being secured to the carriage 15 by a lock ring 82 threaded on the lower end of the sleeve 79. FIGS. 1 to 4 illustrate the use of a collet chuck 83 with the carriage 15, the collet 83 being locked in position by a lock ring 84 threaded on the lower end of the collet and bearing on the adjacent end of the sleeve 80.

The head 81 is adapted to be connected, with respect to relative rotation to the carriage 15, by an indexing mechanism similar to that previously described in connection with the base member 13. As will be apparent from a reference to FIGS. 2 and 3, base member 81 may be fabricated from a plurality of parts, secured by suitable screws, that in the embodiment illustrated being provided with a ring 84 which is formed with two different series of indexing bores 85 and 86 therein, cooperable with respective indexing pins 87 and 88, which are urged upwardly by respective compression springs 89. Each indexing pin 88 is adapted to be controlled by an associated cylindrical member 91 generally corresponding to the indexing pin 41 of the construction illustrated in FIGS. 2, 11 and 12, each pin having an eccentric which is disposed in a peripheral slot in the associated index pin, whereby rotation of the associated control member is adapted to reciprocate the pin into or out of engagement wtih an index bore in the plate 84, the latter being seated upon a plate 92 set in the carriage 15 and secured thereto by suitable means such as screws or the like. Each member 91 may be provided with a hex socket or other suitable means for enabling actuation thereof and as illustrated in FIG. 3, with each member 91 being provided with a peripheral slot intermediate its ends into which a set screw may extend, thereby preventing axial movement of the associated members.

In the construction illustrated in FIGS. 13 to 17, the construction is quite similar, the supporting carriage 15' likewise being generally C-shape, and provided with two T-shaped slots 16a and 16b by means of which the carriage may be mounted on an intermediate carriage or other member. However, in this construction the carriage 15' is provided with an opening 93 in the lower leg thereof and an access opening 94 in the connecting wall, facilitating the use of chucks or other equipment associated with the carriage.

Figure 15:
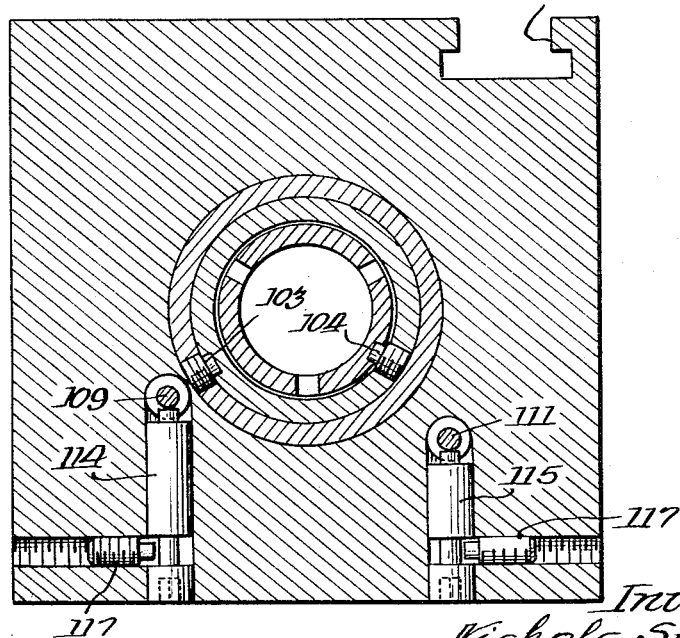
FIG. 15 is a sectional view taken approximately on the line 15—15 of FIG. 13.

Extending through the upper leg of the carriage is a chuck member 94 which is constructed very similar to the corresponding member 81 in the construction illustrated in FIGS. 1 to 4, the chuck member 94 being in the form of a sleeve 95 threaded at its lower end to receive a lock ring 96 and provided at its upper end with a tapered position 97 for the reception of a collet or, as illustrated, a collet adapter 98, the latter being threaded at its lower end to receive a locking ring 99. The adapter 98 is illustrated in FIG. 16 as having a collet 101 disposed therein, the latter also being threaded at its lower end and locked in position by an internally threaded bushing 102. As illustrated in FIG. 15, rotation between the member 94 and the collet adapter 98 as well as between the latter and the collet 101, may be achieved by providing the chuck member 94 with a pin 103 adapted to be seated in a longitudinally extending slot in the collet holder 98 and in like manner the latter may be provided with a pin 104 seated in a similar longitudinally extending slot in the collet 101. The chuck member 94 is adapted to be operatively connected with the leg 95 of the carriage 15' by an indexing mechanism similar to that illustrated in FIGS. 3 and 4, such mechanism comprising a ring-shaped plate 105 which is secured to the chuck member 94 by suitable means such as screws 106, the plate 105 being formed with two concentric series of index bores 107 and 108 therein, the inner series having twenty holes and the outer series having twenty-four to provide a wide range of indexing divisions. Cooperable with the inner series of indexing bores 107 is an index pin 109 and with the outer series of bores an index pin 111, such pins being similarly constructed to the pin 41 illustrated in FIG. 2 or the pins 88 of the structure illustrated in FIGS. 2 and 3.

The respective pins 109 and 111 are urged upwardly by respective springs 112, one of which is illustrated in FIG. 17, the lower ends of each spring being retained in operative position by a suitable cap member 113. Likewise, each pin is adapted to be controlled by a cylindrical member 114 and 115 for the respective pins 109 and 111, which are provided with eccentrics which extend into respective peripheral slots 116 in each of the members 114 and 115 and the members 114 and 115 are secured in axially fixed relationship by set screws 117, as clearly indicated in FIG. 15.

The embodiment illustrated in FIGS. 13 to 17 also includes a pair of stop members 118 carrying horizontal disposed adjusting series 118 which may be locked in any desired radial position with respect to the axis of the collet 101. In the embodiment illustrated, each stop 118 is adapted to be clamped to a mounting ring indicated generally by the numeral 119 constructed in the form of two annular ring members 121a and 121b which are provided with opposed annular slots therein. The ring 121a and 121b may be suitably secured together, as for example, screws 122 and in like manner may be rigidly mounted on the upper leg of the carriage by screws 123. The stops 118 may be rigidly clamped to the ring assembly by respective screws 124 threaded into arcuate-shaped nuts 125 disposed in the opposed slots in the ring member. As illustrated in FIG. 13, the outer periphery of the rings 121a and 121b are spaced to form an annular slot through which the screws 124 extend, whereby the stop members 118 may be disposed anywhere about the periphery of the respective rings. The stop members 118 may be used to limit relative rotation of the collet assembly either by engagement with a portion of the work or by an engagement with an arm suitably rigidly mounted on the collet holder.

FIGS. 18 and 19 illustrate an additional fixture for use on the intermediate carriage 14 for retaining cylindrical or semi-cylindrical objects and the like in operative position for the performance of operations thereon, for example, semi-circular split bushings B in FIGS. 18 and 19. This structure utilizes a generally C-shaped block 125 having a rectangular shaped channel 126 in which is vertically movable a V-block 127, longitudinal movement of the latter relative to the block 125 being prevented by guide pins 128 and disposed in vertically extending bores 129 in the V-block.

The block 125 is mounted on an adapter plate 131 which is secured to the block by screws or the like, which in turn is adapted to be mounted on the carriage 14. For example, the free end of the plate 131 may be provided with mounting holes 132 therein for the reception of attaching screws which may be threaded into the intermediate carriage 14 as for example, at the end portions of the guide head 74 whereby the plate 31 would extend vertically as viewed in FIG. 5. Extending across the upper edges of the block 125 and secured thereto by suitable means such as screws 133 are a pair of work-retaining bars 134, the latter having a plurality of elongated slots 135 therein for reception of the screws 133, whereby the bars may be moved in opposite directions toward or away from one another to accommodate work disposed on the V-block 127. The V-block may be moved upwardly to clamp an object such as a bushing between the block and the bars 134 by a plurality of set screws 135 threaded into the block 125 and bearing upon the lower surface of the V-block. This construction permits the block to be readily lowered with respect to the bars 134 to release work for repositioning or removal without requiring the manipulation of the screws 133.

It will be apparent from the above description that the device described is extremely versatile in usage, providing a substantially universal fixture for supporting either an object to be worked upon, or a tool, in any one of many possible combinations, many of which permit the work or the tool to be rotated about various axes on both long and short radii, as well as in transverse directions along straight lines, whereby a very wide variety of operations may be performed.

To facilitate an appreciation of such flexibility of the device, a brief description of some of the possibilities follow, which merely represent typical examples of functions capable with the present invention.

It will be particularly noted, referring to FIG. 1, that the set-up therein illustrated, disclosing the support of an object C, which for the purposes of explanation will be assumed to be a milling cutter which is to be worked upon, the axis of the cutter may be disposed at substantially any desired relationship with respect to the horizontal or the vertical. Thus, the cutter may first be rotated about its axis by effecting rotation of the supporting collet therefor in the carriage 15. In addition, the cutter may be pivoted about the block 1a, assuming that the carriage is mounted on the latter in the manner illustrated in FIGS. 2 and 3. The block 1a in turn is pivotal about its longitudinal axis as a result of its connection with the block 8, and in turn, the block 8 may be pivoted about the axis of the pin 9 which extends transversely with respect to the longitudinal axis of the block 1a. Consequently the cutter C may be rotated into substantially any desired position and suitably indexed about its own axis while in such position. At the same time a feeding adjustment parallel to the axis of the cutter C may be effected by rotating the screw 76 by means of the knurled knob or head 77. In like manner a feeding movement transverse to the axis of the cutter C may be effected by rotating the knob 58, thereby moving the intermediate carriage 14 relative to the base member 13, the screw 56 providing a micrometer adjustment for such feeding movement.

It is also possible to feed the carriage 14 through the rack and pinion construction, the pinion 63 being engaged with the rack 62 as heretofore described, the pinion being suitably rotated by means of the hex socket on the end of the shaft 64, into which a suitable hex wrench may be inserted.

If it is desired to dispose the axis of the cutter C in a vertical position, this may be readily accomplished by supporting the holder 15 on the intermediate carriage 14 by means of the T-shaped slot 16b instead of the slot 16a. Likewise, if it is desired to provide a vertical feed, this can be done by rotating the block 1a to dispose the direction of travel of the holder 15, with respect to the intermediate carriage 14, in a generally vertical position.

It will be apparent that the use of two blocks 1a and 1b permits a wide variety of clamping operations to be performed and at the same time enable disposition of an object so clamped in substantially any position with respect to the horizontal, or with respect to a particular supporting surface on which the device is mounted, by rotation of the blocks about the longitudinal axis of the block 1a or about the transverse axis of the pin 9. Likewise, as illustrated in FIG. 1, with the use of two blocks an object may be supported in the jaws 4, while another object is supported in the holder 15.

It will be appreciated that where two blocks 1a and 1b are employed a further adjustment is provided in that the block 1b may be angularly disposed with respect to the block 1a. Likewise, the holder 15' may be substituted for the holder 15, providing a wide variety of indexing operations in addition to those achievable with the latter.

In place of collet holders 15 and 15', the fixture illustrated in FIGS. 18 and 19 may be substituted, therefore enabling a wide variety of objects to be supported, to which objects feeding movements may be imparted either along straight lines or about any of the pivotal axes of the structure.

In like manner it is also possible for various types of cutters to be supported in the device enabling movement of such cutter along both large and small radii.

It will be particularly noted that the device not only permits such types of movement but at the same time, where a holder such as the holder 15 or 15' is employed, an object may be supported at any desired angular relation and at the same time indexed about the collet axis. Furthermore, in connection with such indexing operations, the supporting structure may be indexed about the axis of the block 1a with respect to the holder 8, and the base member 13 indexed with respect to the block 1a or 1b on which it is mounted, thus providing substantially infinite possibilities of indexing operations, both on small and large radii.

Obviously, the ability to pivot on relatively large radii provides the opportunity, for example, to utilize the device for supporting a suitable diamond or other tool for dressing grinding wheels or other members on such relatively large radii. It will be appreciated that as the blocks 1a and 1b are provided with identical mounting bores, etc. at each end, the various jaws and base members adapted to be disposed thereon may be suitably positioned at either end of either block. Thus, for example, the index block 37 may be disposed at either end of the block 1b or may be disposed at either end of the block 1a, depending upon the particular operation involved.

It is believed apparent that the provision of interchangeability provides additional latitude in setting up the device for any particular operation. Obviously, the assembly normally will be set up as compactly as possible consistent with the achievement of the desired functions, whereby all supporting elements are as short and rigid as possible.

It will also be apparent that either of the blocks 1a or 1b may be employed as a bed member, for example, to support a tail stock or the like, cooperable with either of the index holders 15 or 15', either with the use of collets or a face plate and driving dog, whereby an elongated object may be supported between centers and provided with straight line and pivotal movements relative to a cutter or other tool, at the same time permitting indexing operations on the supported object.

The above description of possible operations, achievable with the present invention, is, at best, merely typical. The possibilities in usage are limited substantially only to the ingenuity of the operator setting up the device, and those skilled in the art will readily perceive many other widely varied types of applications of the present invention to machine tool and other operations.

It will be noted from the above description that I have provided a supporting structure for tools or other objects which provides in a substantially single structure an extremely wide flexibility of utilization as to the supporting functions and in particular the movements which may be imparted to an object supported thereby.

Changes may be made within the scope and spirit of the appended claims which define what is believed to be new and desired to have protected by Letters Patent.

What I claim as new and desire to secure by Letters Patent is:

1. A machine tool and work holder, comprising a base structure, a pair of elongated blocks of rectangular cross-section, means mounting one of said blocks on said base structure for adjustment about a horizontal axis, a plurality of screw members carried by said last mentioned block in longitudinally spaced relation therealong, and extending through the second block, said screws being pivotally connected to said first block on respective parallel axes extending at right angles to the longitudinal block axis, nuts threaded on said screws, operative to retain said second block in a selected relation with respect to the first block, a tool and work supporting structure mounted for pivotal adjustment on said second block about an axis extending at right angles to the longitudinal axis of said second block, said supporting structure having an intermediate carriage slidably mounted thereon, movable along an axis extending parallel to the axis of said second block, and a work and tool supporting carriage mounted on said intermediate carriage for movement along an axis extending at right angles to the direction of movement of said intermediate carriage relative to said tool and work supporting structure.

2. A machine tool and work holder as defined in claim 1, wherein said work and tool supporting carriage is provided with a pair of mounting elements, each of which is respectively engageable with cooperable mounting elements provided on said intermediate carriage, said mounting elements on said work and tool supporting carriage being disposed at right angles with respect to one another whereby an object carried by said work and tool supporting carriage may be disposed in either of two positions with respect to said intermediate carriage.

3. A machine tool and work holder as defined in claim 2, wherein said work and tool supporting carriage is provided with a tool and work holder, disposed for pivotal movement about an axis extending parallel to one of the pair of mounting elements thereon, said pivotal work and tool holder having means carried thereon for effecting an indexing of such holder with respect to said supporting carriage.

4. A machine tool and work holder, comprising a base structure, an elongated block of rectangular cross-section, means mounting said block on said base structure for adjustment about a horizontal axis, a tool and work supporting structure mounted for pivotal adjustment on said block, about an axis extending at right angles to the longitudinal axis thereof, said supporting structure having an intermediate carriage slidably mounted thereon, movable along an axis extending parallel to the axis of said block, and a work and tool supporting carriage mounted on said intermediate carriage for movement along an axis extending at right angles to the direction of movement of said intermediate carriage relative to said tool and work supporting structure.

5. A machine tool and work holder as defined in claim 4, wherein said work and tool supporting carriage is provided with a pair of mounting elements, each of which is respectively engageable with cooperable mounting elements provided on said intermediate carriage, said mounting elements on said work and tool supporting carriage being disposed at right angles with respect to one another whereby an object carried by said work and tool supporting carriage may be disposed in either of two positions with respect to said intermediate carriage.

6. A machine tool and work holder as defined in claim 5, wherein said work and tool supporting carriage is provided with a tool and work holder, disposed for pivotal movement about an axis extending parallel to one of the pair of mounting elements thereon, said pivotal work and tool holder having means carried thereon for effecting an indexing of such holder with respect to said supporting carriage.

7. In a tool and work supporting device, a tool and work supporting structure, a base block on such said tool and work supporting structure mounted for rotation relative thereto about a fixed axis, and means for effecting selective adjustment therebetween, comprising a spindle carried by said supporting structure, extending into said base block, means for preventing axial movement of said spindle and supporting structure relative to said base block, a work wheel carried by said spindle, a work supporting block, slidably mounted in said base block for movement in the plane of said gear in a direction at right angles to the axis of said spindle, a work gear rotatably supported in said worm supporting block in an axis disposed in said plane and at right angles to the direction of movement of such block, movement of the latter being operative to effect engagement or disengagement of said worm gear with respect to said worm wheel, spring means urging said block in a disengaging direction, manually actuatable cam means for effecting movement of said block in a worm-engaging direction, pin means carried by said block, cooperable with said holes in said supporting structure for effecting an indexing of said supporting structure with respect to said base block, spring means urging said index pin in an engaging direction, and manually actuatable cam means engageable with said slot in said pin for moving the latter out of engagement with said tool and work supporting structure.

8. In a tool and work supporting device, a tool and work supporting structure, a base block on such said tool and work supporting structure mounted for rotation relative thereto about a fixed axis, and means for effecting selective adjustment therebetween, comprising a spindle carried by said supporting structure, extending into said base block, means for preventing axial movement of said spindle and supporting structure relative to said base block, a work wheel carried by said spindle, a work supporting block, slidably mounted in said base block for movement in the plane of said gear in a direction at right angles to the axis of said spindle, a work gear rotatably supported in said work supporting block in an axis disposed in said plane and at right angles to the direction of movement of such block, movement of the latter being operative to effect engagement or disengagement of said worm gear with respect to said worm wheel, spring means urging said block in a disengaging direction, and manually actuatable cam means for effecting movement of said block in a worm-engaging direction.

9. In a tool and work supporting device, a tool and work supporting structure, a base block on such said tool and work supporting structure mounted for rotation relative thereto about a fixed axis, and means for effecting selective adjustment therebetween, comprising a spindle carried by said supporting structure, extending into said base block, means for preventing axial movement of said spindle and supporting structure relative to said base block, a work wheel carried by said spindle, a work supporting block, slidably mounted in said base block for movement in the plane of said gear in a direction at right angles to the axis of said spindle, a work gear rotatably supported in said worm supporting block in an axis disposed in said plane and at right angles to the direction of movement of such block, movement of the latter being operative to effect engagement or disengagement of said worm gear with respect to said worm wheel, spring means urging said block in a disengaging direction, manually actuatable cam means for effecting movement of said block in a worm-engaging direction, pin means carried by said block, cooperable with said holes in said supporting structure for effecting an indexing of said supporting structure with respect to said base block, spring means urging said index pin in an engaging direction, and manually actuatable cam means engageable with said slot in said pin for moving the latter out of engagement with said tool and work supporting structure.

10. In a tool and work supporting device, a tool and work supporting structure, a base block on such structure, mounted for rotation relative thereto about a fixed axis, and means for effecting selective adjustment therebetween, comprising a spindle carried by said supporting structure, extending into said base block, means for preventing axial movement of said spindle and supporting structure relative to said base block, a worm wheel carried by said spindle, a worm gear rotatably supported in said supporting structure for rotation about an axis disposed in the plane of said worm wheel and engageable with the latter, means for effecting manual rotation of said worm gear to rotate said worm wheel and spindle, one of said engageable gears being movable out of engagement with the other gear whereby said spindle may be rotated independently of said gears.

11. A tool and work supporting device, comprising a base member, an intermediate carriage slidably mounted on said base member, and a tool and work supporting carriage slidably mounted on said intermediate carriage, the direction of movement of said supporting carriage being at right angles to that of said intermediate carriage relative to said base member, means operatively connecting said intermediate and supporting carriages for retaining the same in selected relative positions, an adjusting screw, carried by said base member and extending parallel to the direction of movement of said intermediate carriage relative thereto, a guide member movable relative to both of said carriages, said guide member having a threaded bore in which is said adjusting screw, engageably disposed, rotation of said screw being operative to move said guide member relative to said base member, releasable means for rigidly connecting said intermediate carriage to said guide member for movement therewith relative to said base member, a rack carried by said intermediate member and extending parallel to the direction of travel thereof, a pinion carried by said base member, said pinion being axially movable into and out of engagement with said rack, spring means urging said pinion in its disengaged position, means rigidly connected with said pinion for effecting manual rotation thereof, and manually actuatable means for retaining said pinion in either of its positions.

12. A tool and work holder as defined in claim 11, wherein said means connecting said carriages comprises an adjusting screw carried by said carriage, cooperable with threaded means on said supporting carriage for effecting movement between said carriages by rotation of adjusting screw.

13. A tool and work supporting device comprising a base member of generally C-shaped configuration having a pair of spaced generally parallel leg portions connected at one of their corresponding ends by an intermediate portion, one of said leg portions being constructed for engagement with a supporting member, the other leg portion having a bore therein, a sleeve member rotatably supported in said bore, a chuck member disposed in said sleeve, means for preventing relative relation therebetween, and indexing means operatively connecting said sleeve and base member for effecting an indexing of said sleeve with respect to said base member, said indexing means comprising indexing bores formed in said sleeve member, and an index pin slidably mounted in said base member, spring means urging said pin into engagement with said sleeve member for insertion of said pin into one of said indexing bores, and cam means engageable with a slot in said index pin for selectively moving the latter to an inoperative position.

14. A tool and work supporting device as defined in claim 13, wherein said sleeve member is constructed in the form of a collet holder and the bore thereof is provided with a tapered outer portion complemental to the cooperable portion of said chuck member, the latter having threads on the opposite end thereof, and a lock ring threaded on said chuck member bearing on the inner end of said sleeve member for securing said members in operative relation.

15. A tool and work supporting device as defined in claim 14, wherein chuck member is constructed in the form of a sleeve member with its outer end of its bore having a tapered portion for engagement with a complementally shaped portion of a collet disposed in such bore, means for preventing relative rotation between said chuck member and such a collet, the latter having a threaded inner end, and a locking collar having threads cooperable with the threads on such a collet, and adapted to bear on said chuck member for firmly connecting such collet therewith.

16. A tool and work supporting device as defined in claim 15, wherein two series of indexing holes are provided, having a different total number of holes therein, and an indexing pin is provided for each series, the latter being concentrically disposed with respect to the collet axis.

17. A tool and work supporting device as defined in claim 16, comprising stop members adjustably disposed for adjustment concentrical about the axis of said sleeve member.

18. A tool and work supporting device for small objects comprising a C-shaped block, a V-block movably disposed between the opposed leg portions of said C-block, a plurality of guide pins extending between said blocks for restricting longitudinal movement of said V-block relative to said C-block, but permit guided transverse movement therebetween, a pair of abutment members disposed on the legs of said C-block and movable toward and away from one another for disposition in overlying relation with respect to said V-block, means for securing the respective abutment members in their selected adjusted positions, and screw means carried by said C-block engageable with said V-block for urging the latter toward said abutment members for operatively clamping an object therebetween.

References Cited by the Examiner

UNITED STATES PATENTS 2,970,833    2/1961    Stevens _____ 269—43

RICHARD H. EANES, Jr., *Primary Examiner*.